United States Patent [19]

Carpani

[11] Patent Number: 4,807,352
[45] Date of Patent: Feb. 28, 1989

[54] MACHINE FOR REMOVING BASECUPS FROM PLASTIC BOTTLES

[75] Inventor: Anthony J. Carpani, Castle Hill, Australia

[73] Assignee: Glass Containers Pty. Ltd., Castle Hill, Australia

[21] Appl. No.: 63,640

[22] Filed: Jun. 17, 1987

[30] Foreign Application Priority Data

Nov. 12, 1986 [AU] Australia .............................. PH8926

[51] Int. Cl.⁴ ............................................. B23P 19/00
[52] U.S. Cl. ................................. 29/564.1; 29/426.2; 198/626
[58] Field of Search .................... 29/235, 426.1–426.6, 29/564.1, 822, 823; 53/381, 381 A; 198/626–628

[56] References Cited

U.S. PATENT DOCUMENTS

| | | | |
|---|---|---|---|
| 3,108,682 | 10/1963 | Zipper | 198/626 |
| 4,095,390 | 6/1978 | Knudsen | 198/626 |
| 4,402,123 | 9/1983 | Mitchell | 29/426.5 |
| 4,418,594 | 12/1983 | Burns, Jr. | 83/19 |
| 4,443,925 | 4/1984 | Fish | 29/426.4 |

Primary Examiner—Neil Abrams
Attorney, Agent, or Firm—Warren J. Krauss

[57] ABSTRACT

The invention relates to a machine for removing basecups from plastic bottles in which basecups are bonded or adhered to the bottom thereof. The machine includes conveyor means adapted to pass bottles towards a cutting station. The machine further includes laterally spaced apart stripping rails positioned below and spaced apart from the conveyor means, the arrangement being such that necks of bottles are gripped by and between the conveyor means, while the stripping rails engage over or above the basecups, passage of the bottles towards the cutting station by the conveyor means, causing the stripping rails to force the basecups downwardly and away from the bottles, thereby breaking any bond or adhesion therebetween and separating the basecups from the bottles. The cutting station includes means which thereafter remove a lower portion of the bottle as contaminated with bonding agent or adhesive, as a result of the bond between the bottles and the basecups.

3 Claims, 3 Drawing Sheets

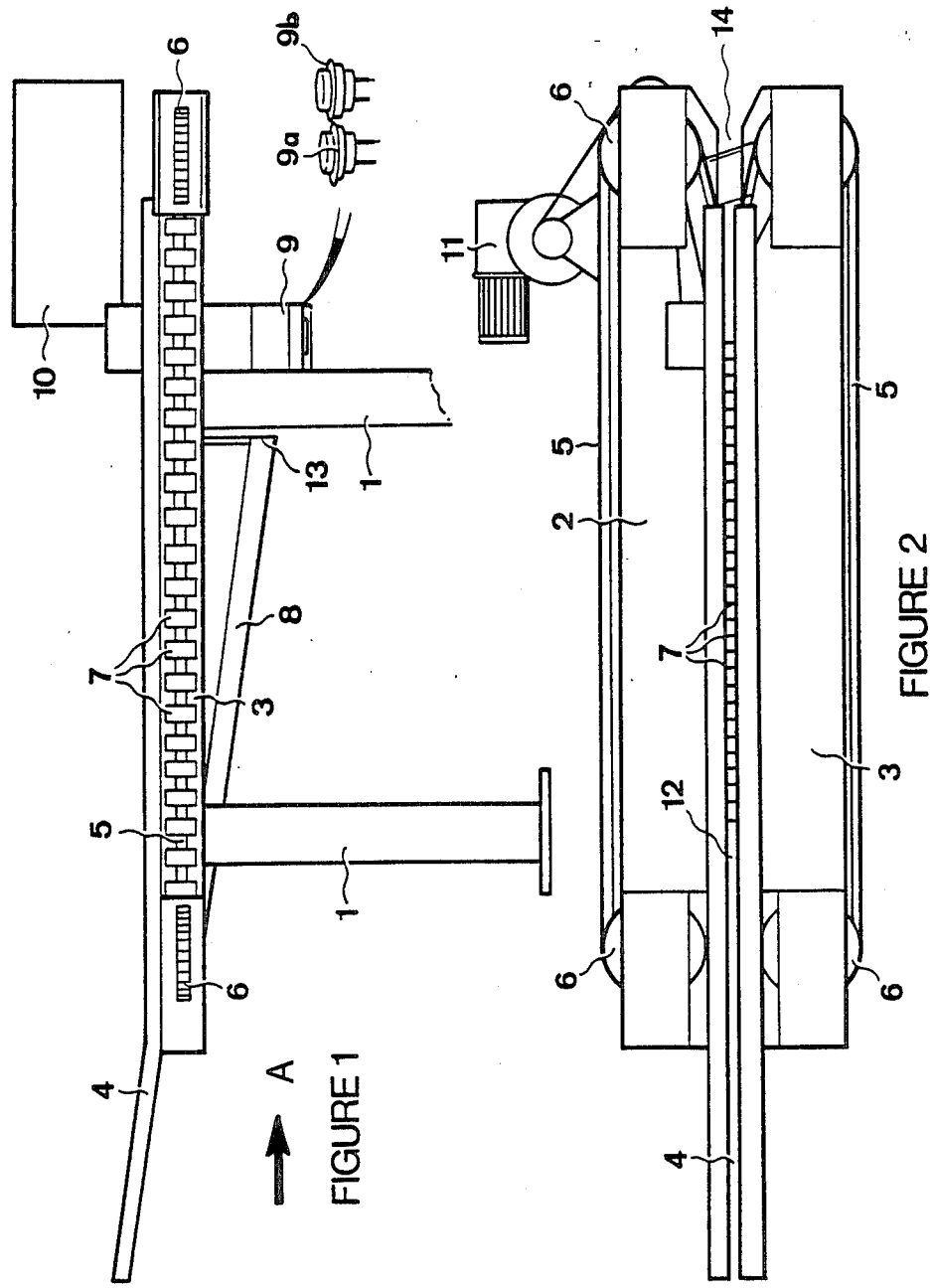

MACHINE FOR REMOVING BASECUPS FROM PLASTIC BOTTLES

This invention relates to the plastic bottle manufacturing industry and more particularly to a machine for automatically recovering a maximum amount of polyethylene terephthalate from rejected or faulty two-piece bottles manufactured from that material. Throughout this specification, polyethylene terephthalate will hereinafter be referred to as "P.E.T.".

Many beverages and other products are today packaged in what the industry terms "two-piece P.E.T. bottles". Such bottles comprise a bottle proper made from P.E.T. and a "basecup" on the lower part of the bottle; this basecup is manufactured from black high-density polyethylene adhered to the base of the P.E.T. bottle with a hot-melt glue, usually applied in three spots. It is an object to reduce the environmental impact of thoughtlessly discarded P.E.T. bottles, and hence we desire to recycle the material where possible. However, in the case of two-piece P.E.T. bottles, recovery of materials is complicated by there being two components, of different plastics, adhered together by a glue. The problem has been how to recover a maximum amount of P.E.T. from faulty or otherwise recyclable bottles for granulating and re-use as "regrind P.E.T." free from contamination by glue.

According to one aspect of this invention, there is provided a machine for removing basecups from two-piece plastic bottles, wherein said basecups are adhered or bonded to said bottles, said machine comprising: a feed in-station; laterally spaced apart conveyor chains between which a neck of a bottle is gripped for conveyance towards a cutting station; and decupping means comprising laterally spaced-apart stripping rails positioned below and spaced apart from said conveyor chains, said stripping rails being located, in use, above the basecups of bottles held by and between said conveyor chains; so that as said conveyor chains advance bottles towards said cutting station, said stripping rails engage said basecups and force said basecups downwardly away from said bottles, so as to break bonding or adhesion therebetween and so as to separate said basecups from said bottles; said cutting station including cutting means which act to cut off a lower portion of said bottles contaminated with bonding agent or adhesive; said bottles thereafter being discharged from said machine.

In order that a better understanding of the present invention may be gained, hereinafter will be described a preferred embodiment thereof, by way of example only and with reference to the accompanying schematic drawings in which:

FIG. 1 is a side elevation of a machine according to the present invention;

FIG. 2 is a corresponding plan view;

Throughout the drawings, like integers are referred to by the same numeral.

Figures 3, 4:
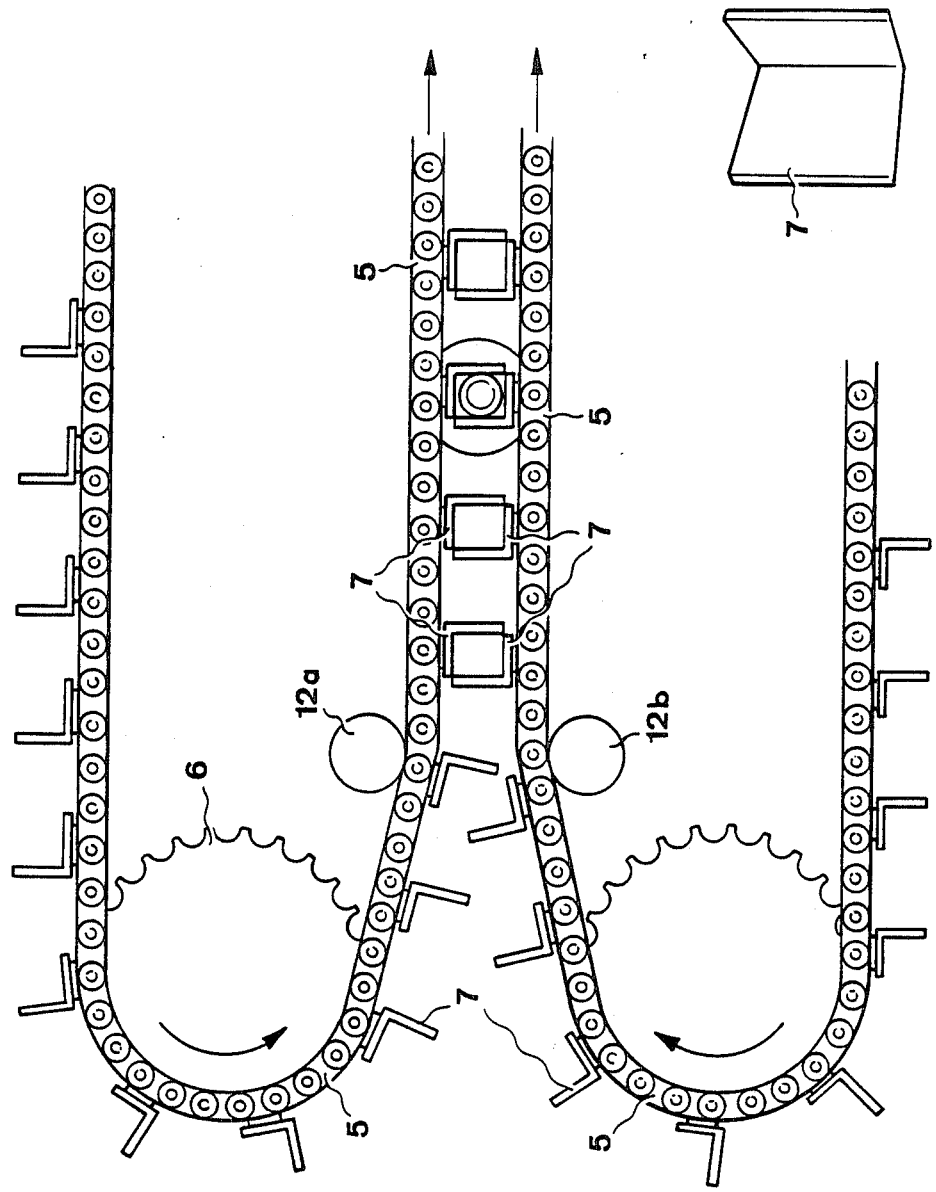
FIG. 3 shows part of the machine, in greater detail.
FIG. 4 illustrates a gripping cleat.
Figure 5:
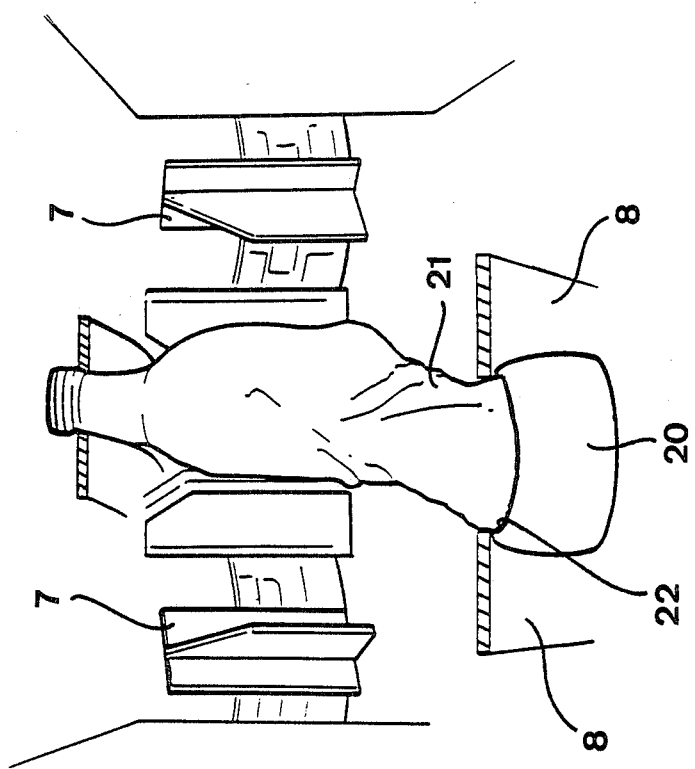
FIG. 5 illustrates gripping cleats and decupping rails generally along arrow "A" of FIG. 1.

The inventive machine for automatically removing basecups from two-piece P.E.T. bottles is mounted upon a stand having four legs, as those referenced 1 in FIG. 1, able to be bolted down to a factory or plant floor. This stand supports a pair of horizontally-disposed beams, namely a main frame beam 2 and a pivot beam 3 which together and in turn support the various mechanisms and components.

At a first end of the machine there is a feed-in station including a pair of horizontally spaced-apart, downwardly-inclined, bottle-neck supporting rails 4. Extending substantially the full length of the beams 2 and 3 are a pair of horizontally spaced-apart conveyor chains 5, each running about a pair of sprockets 6 and being provided with a plurality of gripping cleats as indicated at 7.

Beneath the beams 2, 3 there is a pair of de-cupping and stripping rails 8 which are inclined downwardly towards a cutting station, generally indicated at 9, and relative to said conveyor chains 5, the cutting station 9 essentially being comprised of a co-acting pair of rotary cutting blades 9a, 9b rotatable about vertical axes.

At that end of the machine remote from the feed-in station is a protective casing, schematically indicated at 10 and housing chain-and-sprocket drives to the chain conveyors and to the cutting blades 9a, 9b—as is best to be seen in FIG. 2. Primary drive is supplied by, say, a 1.1 Kw electric motor and worm-box assembly 11.

The machine operates in the following manner: bottles to be recycled are fed, neck upwards, by an operator, on to and between neck supporting rails 4 where they are gravity fed to the nip region 12 between the two conveyor chains 5, this nip region 12 being formed as a result of the chains running about idler rollers 12A.

As will be seen particularly from FIGS. 3 and 4 of the drawings, each gripping cleat cleat 7 has an L-shaped cross-section and is paired with a cooperating cleat complementorily-oriented so that a bottle neck may be gripped therebetween for conveyance towards cutting station 9.

When each bottle reaches a predetermined point in its travel, decupping and stripping rails 8 engage with and above the rim or lip 22 of a bottle basecup 20 and force it downwardly away from the bottle body 21 to break the adhesive bond between bottle 21 and basecup 20 and allow the discarded basecup to fall from end 13 of the de-cupping rails 8 into a container (not shown). The basecups may be recovered for either granulation and subsequent re-use as "regrind" material or for reglueing onto a new bottle.

Following removal of a basecup, as described above, the bottle progresses to cutting station 9 and between rotating blades 9a and 9b which cut off the glue-contaminated bottom section of bottle 21.

After completion of the two operations, the treated bottles are discharged at discharge station 14, ready for feeding into a granulator.

The machine is able to process all sizes of bottle likely to be manufactured in a P.E.T. plant. Typical sizes range from heights 258 mm to 334 mm and diameters from 91 mm to 128 mm. It is envisaged that other size ranges could also be accommodated, providing that all bottles have a constant neck size.

In order to minimise the amount of glue-contaminated P.E.T. cut from the bottle, when changing from one bottle size to another blade adjusting means is provided to handle the typical height range of 76 mm. While throughput will be obviously limited by the operator feed rate, the machine is nevertheless capable of processing 65 to 70 bottles per minute. In the event of jamming, pivot beam 3 is able to be swung outwardly to provide a removal of partly processed bottles.

Although the invention has been described above with specific reference to a preferred embodiment, it will be realised that the invention may be embodied in other forms or carried out in other ways without departing from the spirit or essential characteristics thereof. Therefore, the above description is to be considered illustrative only, and all changes which come within the range or ambit of equivalency are intended to be encompassed therein.

What is claimed is:

1. A machine for removing basecups from two-piece plastic bottles, wherein said basecups are adhered or bonded to the said bottles, said machine comprising: a feed-in station; laterally spaced-apart conveyor chains between which a neck of a bottle is gripped for conveyance towards a cutting station; and decupping means comprising laterally spaced apart stripping rails positioned below and spaced apart from said conveyor chains, said stripping rails being located above said basecups of said bottles held by and between said conveyor chains; so that as said conveyor chains advance said bottles towards said cutting station, said stripping rails will engage with said basecups and force said basecups downwardly away from said bottles, to break bonding or adhesion therebetween and to separate said basecups from said bottles; said cutting station including cutting means which function to cut off a lower portion of said bottles contaminated with bonding agent or adhesive; said bottles thereafter being discharged from said machine.

2. A machine as claimed in claim 1, wherein said stripping rails are inclined downwardly relative to said conveyor chains towards a discharge end of said machine.

3. A machine as claimed in claim 1, wherein said cutting station comprises a pair of co-acting cutting blades rotatable about vertical axes.

* * * * *